United States Patent [19]

Goodhart

[11] 4,234,109
[45] Nov. 18, 1980

[54] MATERIAL-DISPENSING IMPLEMENT

[76] Inventor: Robert D. Goodhart, 115 E. Kruzan, Brazil, Ind. 47834

[21] Appl. No.: 807,357

[22] Filed: Jun. 17, 1977

[51] Int. Cl.³ ..................... A01C 15/16; A01C 23/00
[52] U.S. Cl. .................................. 222/609; 222/610; 239/289; 239/662; 239/663; 239/675
[58] Field of Search .............. 239/662, 663, 670, 675, 239/289; 222/609, 610, 608, 1, 413

[56] References Cited

U.S. PATENT DOCUMENTS

| 2,601,08 | 6/1952 | Hansen | 222/413 |
|---|---|---|---|
| 1,178,299 | 4/1916 | Cornelius | 239/663 X |
| 1,613,051 | 1/1927 | Napier | 239/662 X |
| 2,393,849 | 1/1946 | Werts | 239/663 X |
| 3,206,215 | 9/1965 | De Jong | 239/662 X |
| 3,322,429 | 5/1967 | Cerveu | 239/675 X |
| 3,365,103 | 1/1968 | Van Der Lely et al. | 239/675 X |
| 3,401,890 | 9/1968 | Middlesworth | 239/670 |
| 3,596,791 | 8/1971 | Olsson | 222/609 X |

Primary Examiner—Robert J. Spar
Assistant Examiner—Frederick R. Handren
Attorney, Agent, or Firm—Woodard, Weikart, Emhardt & Naughton

[57] ABSTRACT

A material-distributing implement which is mountable to the flat bed of a truck for distributing dry material in one configuration and liquid in a second configuration. The disclosed embodiment includes a frame, a hopper, three auger sections mechanically coupled in line with each other and an arrangement of mechanical components and features for converting the implement from the dry material configuration to the liquid configuration and back to the dry configuration. A first auger section driven by the truck's power take-off is supported between the front and rear walls of the hopper. Dry material in the hopper is transferred through an aperture in the rear wall to a second auger section which is also mounted to the bed of the truck. The final auger section receives the dry material from the second section and transfers this material to a remote location, beyond the rear of the truck, for distribution. A shroud positioned within the hopper, and whose elevation is adjustable, controls the flow rate of dry material from the hopper to the first auger section. This same shroud is adaptable to seal around the first auger section when the implement is converted to a liquid configuration.

16 Claims, 25 Drawing Figures

MATERIAL-DISPENSING IMPLEMENT

BACKGROUND OF THE INVENTION

1. Field of the Invention

This invention relates in general to material-distributing implements, and in particular, to agricultural devices for spreading and spraying chemicals and fertilizer.

2. Description of the Prior Art

There are several types of fertilizer and chemical-spreading devices which normally consist of a container filled with several hundred pounds of dry fertilizer and means to transport the fertilizer from the container to a broadcasting device. This broadcasting device then propels the dry fertilizer into a somewhat uniform pattern over the ground as the conveyance on which this spreading device is mounted travels. There are related systems for spraying liquid fertilizer or chemicals from a tank by means of a pump, hoses, and sprayer mechanisms. The usual conveyance for large scale requirements is a truck having a flat bed of several feet in length, with axle strength suitable to support several thousand pounds. Although smaller systems (for smaller requirements) could be pulled by a small truck or tractor, such as the device of U.S. Pat. No. 3,365,103 to Van Der Lely et al., such systems are not capable of carrying more than a few hundred pounds and thus require frequent refilling which is a time-consuming activity. Other systems, such as shown by U.S. Pat. No. 3,322,429 to Cervelli and by U.S. Pat. No. 3,687,376 to Van Der Lely employ lighter weight vehicles to carry the fertilizer and these systems are also not suitable for loads in the range of ten to sixteen tons.

There are, however, larger apparata capable of carrying the types of large loads previously mentioned. One such apparatus is shown by U.S. Pat. No. 3,419,221 to Fyrk. This apparatus consists of a container in what appears to be a permanently mounted arrangement on the chassis of a truck. A pair of conveyors along the base of the container transport dry material to a single spreader. Although one feature of this device is that the container is divided into two parts so that two different materials can be loaded and then delivered separately to the spreader where they will be mixed as they are distributed over the ground, it is important to note that the truck is obligated to this type of use, regardless of the season or the need that the user would have, because of the way in which the container is permanently mounted to the truck. Thus, one truck is dedicated solely to spreading dry material and is of virtually no other agricultural value or use. If the container was removable, the truck could possibly be used for other purposes and the dollars invested in the truck would be put to better use. Another disadvantage with this type of apparatus is that the truck and container arrangement are only suitable for the distribution of dry material and the arrangement is unable to accommodate liquids which the user might want to spray over the ground as part of a total agricultural program. A still further disadvantage is that a particular container is constructed to fit a particular style of chassis so that the spreader mechanism will extend beyond the rear of the chassis for dry material applications. This requires a different container for each variation in the length of the truck chassis. Furthermore, a large portion of the weight is distributed over the rear axle which adds to any handling difficulties which the driver of the truck may encounter.

Another apparatus capable of carrying large loads is shown by U.S. Pat. No. 3,559,894 to Murray. This material-spreading apparatus has a pair of interchangeable conveyor assemblies. One conveyor assembly is an auger design and the other is a drag bar design. Although this apparatus is capable of spreading different types of dry material, there are no provisions to use the apparatus as a liquid-spraying apparatus.

One attempt to provide the dual capability of both dry and liquid material distribution is shown by U.S. Pat. No. 3,401,890 to Middlesworth. This spreader and sprayer combination does in fact provide this dual capability but has the apparent disadvantages of a limited load capacity as well as completely obligating the truck for this single agricultural activity. The dual set-up requires an investment into two virtually complete, yet separate, arrangements. If liquid is required somewhat infrequently, the liquid tank and associated sprayer mechanism still must be hauled around each time dry material is going to be spread. This just adds dead weight which could be more efficiently replaced with additional dry material.

SUMMARY OF THE INVENTION

One embodiment of the present invention might include a material-dispensing implement mountable to a vehicle for distributing dry material in a first configuration and liquid in a second configuration, the implement being repeatedly changeable from one configuration to the other which comprises a frame, a vessel, means for conveying material within the vessel to a remote location and means for converting from one configuration to the other configuration. The frame is attachable to the vehicle and the vessel is mountable onto the frame.

Another embodiment of the present invention might include a method of converting a fertilizer and chemical-spreading implement having a material vessel and shroud from an auger transporting, dry material configuration to an auger driving, liquid configuration which comprises removing virtually all the dry material, fitting the shroud with a series of gasket members and clamping the shroud against the interior of the material vessel so as to completely seal around the auger thereby making the vessel liquid tight.

One object of the present invention is to provide an improved material-dispensing implement.

Related objects and advantages of the present invention will be apparent from the following description.

DESCRIPTION OF THE PREFERRED EMBODIMENT

Figure 1:
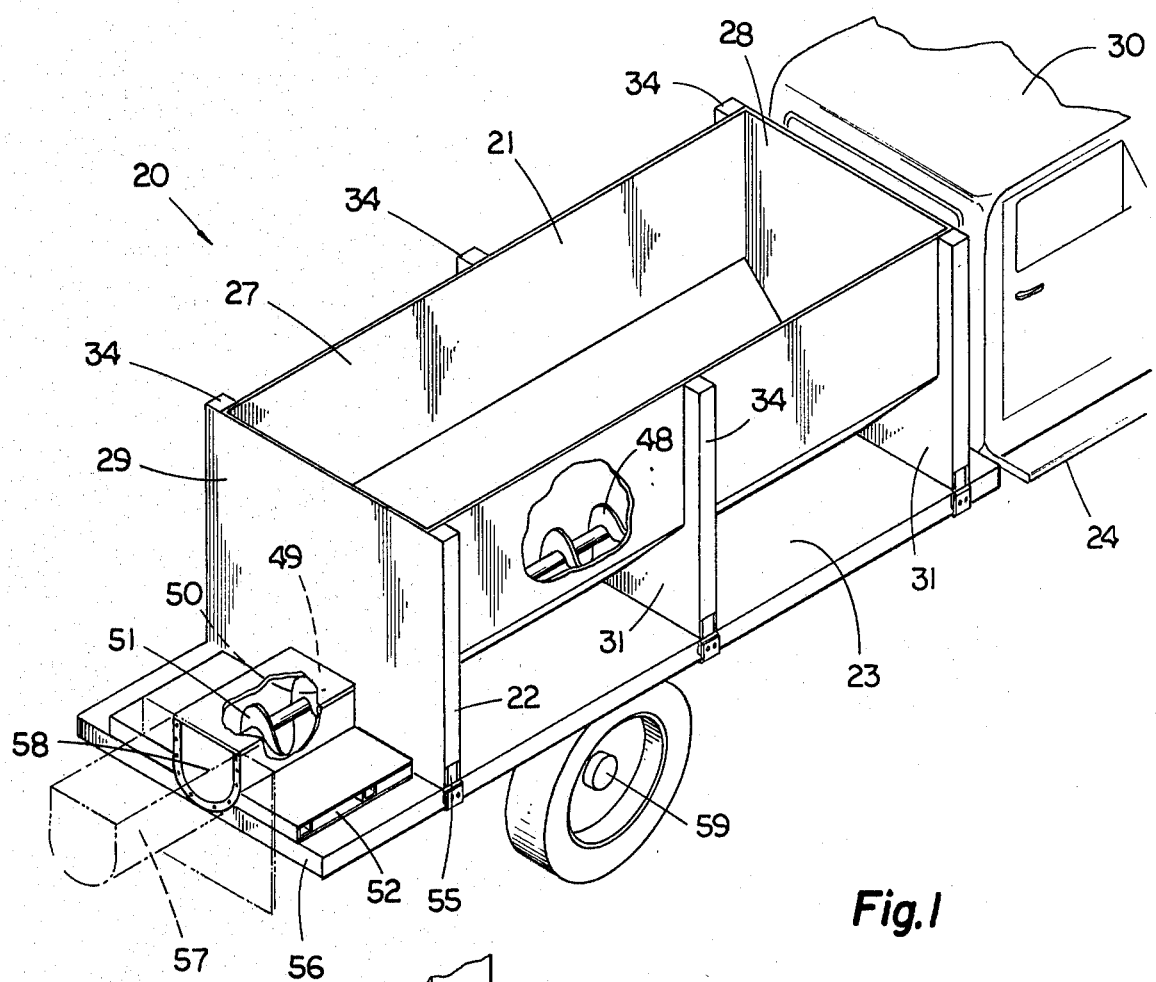
FIG. 1 is a partial perspective view of a material-dispensing implement according to the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated a material-dispensing implement 20 which includes a hopper 21 mounted to a frame 22 which is attached to the flat bed 23 of truck 24. Hopper 21 is a multiwall design which has an open top 27, a front wall 28 and a rear wall 29. Rear wall 29 is generally flat throughout its entire surface and serves a dual function of being both a wall for hopper 21 and one member of frame 22. Front wall 28 which comprises a portion of one upright support plate 31, is generally flat on its upper portion but then is inclined in a direction toward the rear wall and away from cab 30 of truck 24. This inclined portion can be seen in FIG. 3 and the use which is made of the resulting clearance between the cab 30 and hopper front wall 28 is shown in FIG. 6a.

Frame 22 consists of rear wall 29 and a pair of upright support plates 31 which are shaped so as to provide a cavity into which hopper 21 will fit with arm portions 34 extending upwardly on both sides of hopper 21. The support plates 31 are rigidly secured to hopper 21 such as by welding so that the hopper 21 and frame 22 can be handled as a single, integral component. The lower edge of plates 31 are fabricated so as to provide means for the attachment of the hopper 21 (and frame 22) to the flat bed 23 of truck 24.

Figure 1A:
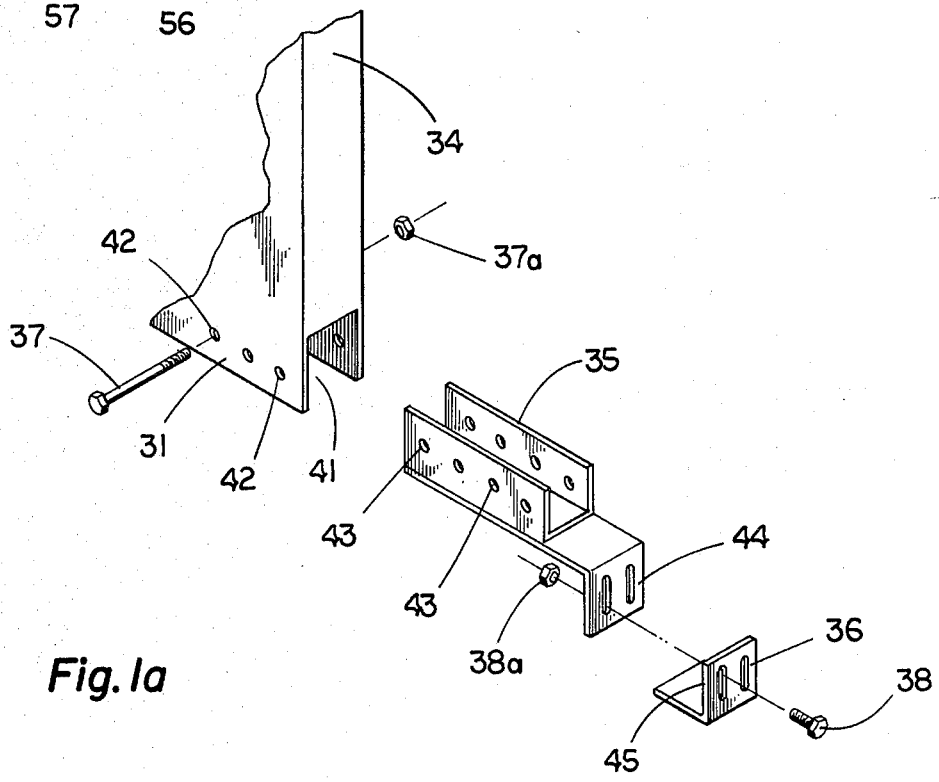
FIG. 1a is an exploded detail view of a clamping bracket arrangement comprising a portion of the FIG. 1 implement.

Referring to FIG. 1a, a representative plate 31 and arm portion 34 are shown in an exploded view along with support bracket 35, L-clamp 36, bolt 37, nut 37a, bolt 38 and nut 38a. Although only a single bolt 37 (38) and single nut 37a (38a) are shown at each location, it is to be understood that similar hardware is employed through each of the shown clearance holes. At the lower edge of plate 31 is a recessed area 41 and a series of clearance through holes 42. Support bracket 35 slides into recessed area 41 and holes 43 are lined up with holes 42 such that the dimension between the brackets 35 on opposite sides of bed 23 are set at a span which approximates the width of bed 23. Bolts 37 and nuts 37a are used to secure support bracket 35 to plate 31. L-clamp 36 is used to clamp the thickness of bed 23 between bracket 35 and clamp 36. The depending portion 44 of bracket 35 has two slots which are aligned with two slots in the upright portion 45 of clamp 36. These slots permit various thicknesses of flat beds to be rigidly clamped without having to change the design or size of the various clamping components. Once the two sets of slots are aligned, bolts 38 and nuts 38a secure clamp 36 to bracket 35.

Figure 3:
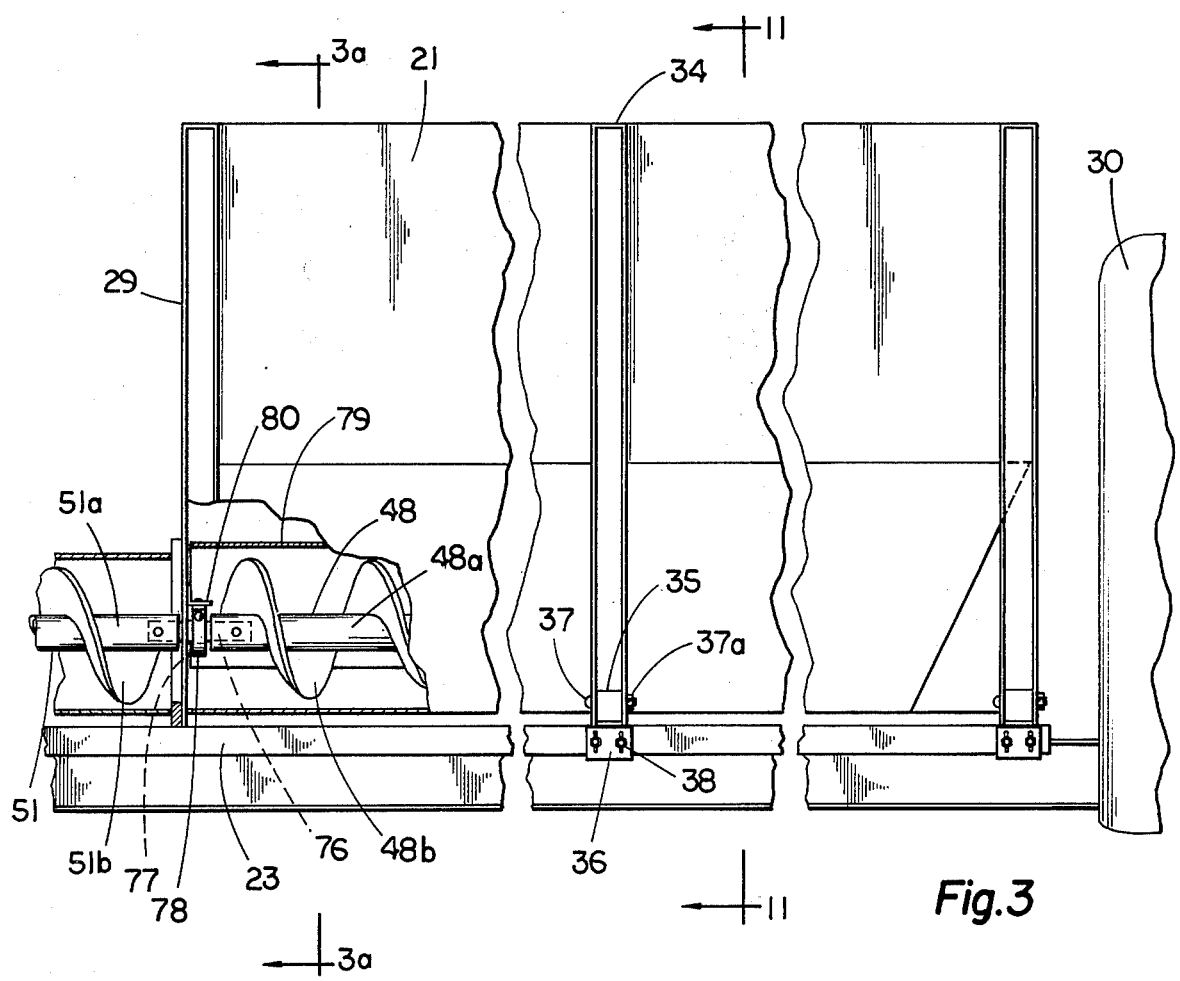
FIG. 3 is a fragmentary, side elevational view of a hopper over comprising a portion of the FIG. 1 implement.
Figure 3A:
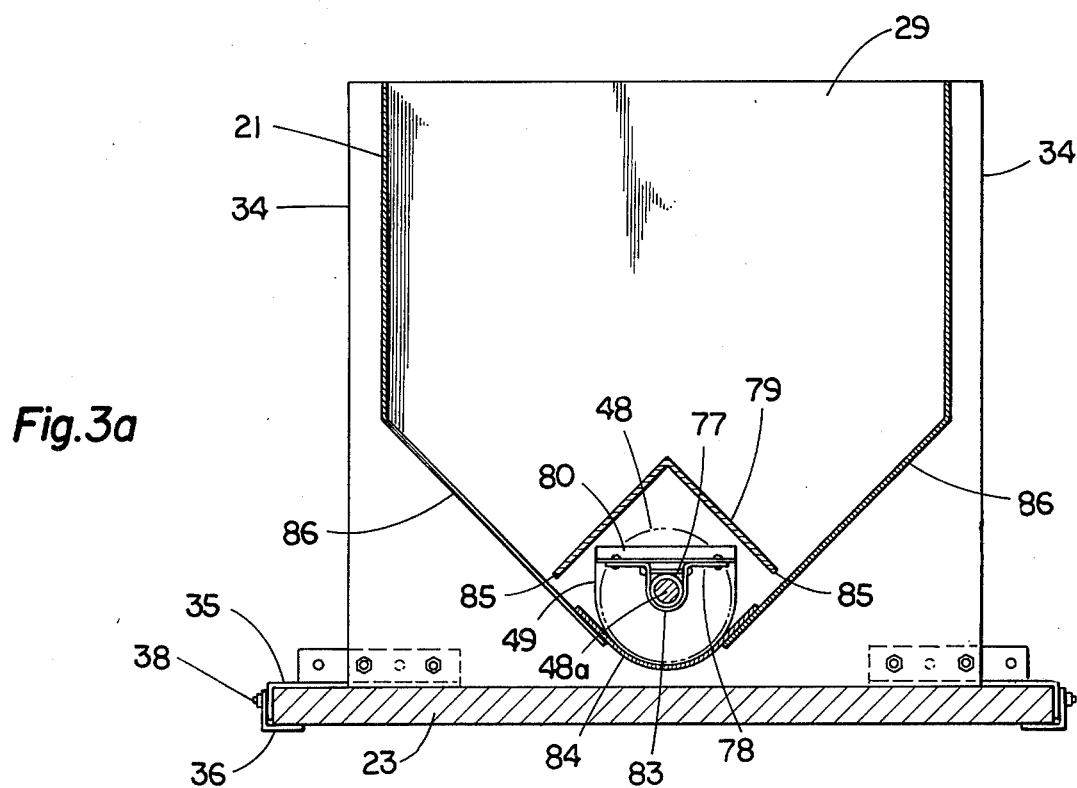
FIG. 3a is a section view of the FIG. 3 hopper taken along line 3a—3a of FIG. 3.

Suspended between the front and rear walls 28 and 29 of hopper 21 (see FIG. 1) is a first auger section 48. This first auger section is bearingly mounted to front wall 28 and to rear wall 29 as will be described in greater detail later. At the base of rear wall 29 is an elongated, D-shaped aperture 49 which is virtually coincident with the lower edge of hopper 21. Support means which are described in greater detail in FIGS. 3 and 3a are provided to bearingly support the end of first auger section 48 within aperture 49. Mechanically coupled to one end of first auger section 48 at point 50 is second auger section 51. Second auger section 51 is supported by a frame 52, one end of which fits within recess 55 of rear wall 29 where it is rigidly secured. The opposite end of frame 52 is virtually flush with the end 56 of flat bed 23 and second auger section 51 extends from aperture 49 to end 56. Not shown in complete form is a third auger section 57 which is mechanically coupled to the end of second auger section 51 at point 58.

The mechanical coupling of the three auger sections 48, 51 and 57 is such that the axis of rotation of all three is coincident. This permits the first auger section to be driven by coupling to the power take-off from the truck's transmission and the other two auger sections will rotate in response to the driving action of the first auger section. Each auger section is constructed from a rigid cylindrical member, such as, for example, a schedule 40 pipe, around which a helical flight is welded.

The size and positioning of hopper 21 is such that a majority of hopper 21 is set forward of the rear axle 59 of truck 24. This provides a preferred weight distribution for the load within hopper 21 which is being transported. The size and construction of hopper 21 are the same for a single axle truck regardless of increases in the length of the flat bed 23 on which the hopper mounts. Hopper 21 includes a single storage compartment for retaining dry material when in one configuration and for retaining liquid when in another configuration. These two configurations correspond to two different modes of operation of the implement and are separate and distinct from each other such that any dry material and any liquid are not co-mingled. In the event a tandem axle truck is to be used, a somewhat larger hopper 21a (not shown) would be required. However, although hopper 21a is larger than hopper 21, hopper 21a is of a single size and construction for all tandem axle trucks regardless of changes in the length of the flat bed 23a (not shown). Therefore, to compensate for different lengths in truck flat beds while standardizing the size of hoppers 21 and 21a, and to assure that the second auger section 51 extends from aperture 49 to the end 56 of the truck bed; second auger section 51 and its frame 52 are designed as detachable, replaceable units whose length is selected based on the particular length of the truck bed. However, the design is also such that regardless of the bed length, second auger section 51 couples between the first and third auger sections 48 and 57, as previously described.

Figure 2:
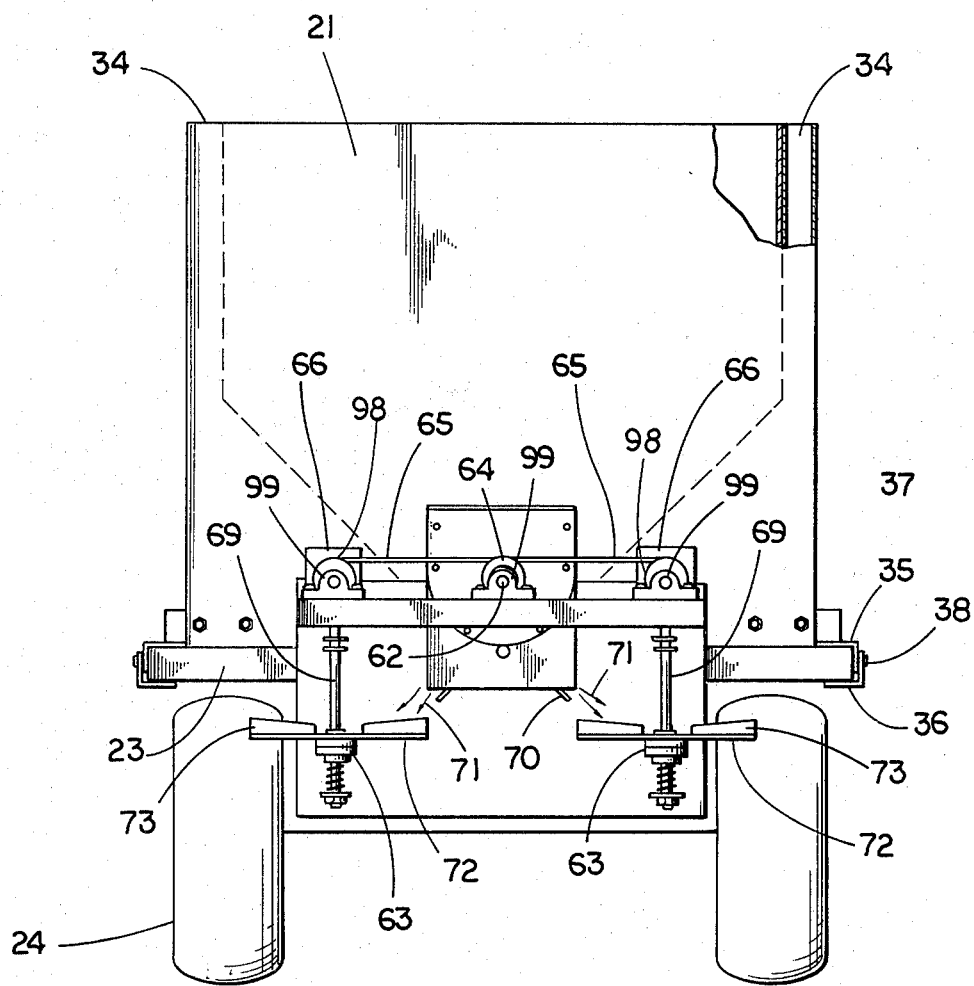
FIG. 2 is an end elevational view of the FIG. 1 implement to which spreading fans are attached.

FIG. 2 is an end elevational view of the implement 20 which illustrates the general position of the hopper 21, arm portions 34, brackets 35, L-clamps 36 and the axis of rotation 62 of the three auger sections 48, 51 and 57. Also shown are a pair of dry material, broadcast spreading fans 63 which are rotated by means of an arrangement of pulley 64, belts 65 and gear boxes 66. The input shaft to each gear box 66 and the end of auger section 57 are supported by bearing support blocks 99. Pulley 64 is secured to the solid shaft of the third auger section 57 (concentric axis 62) such that as the auger sections are rotated by the truck's power takeoff this rotary motion is transferred to the gear box 66 by means of belts 65. Gear boxes 66 are used as speed increasers and convert horizontal rotation, created by belts 65, into vertical rotation to shafts 69. A suitable device for gear boxes 66 is an M series miter and bevel gear box available through Morris Chain of Ithaca, New York. One gear box would be a D-L shaft arrangement and the other gear box a D-L-O arrangement.

Figure 4:
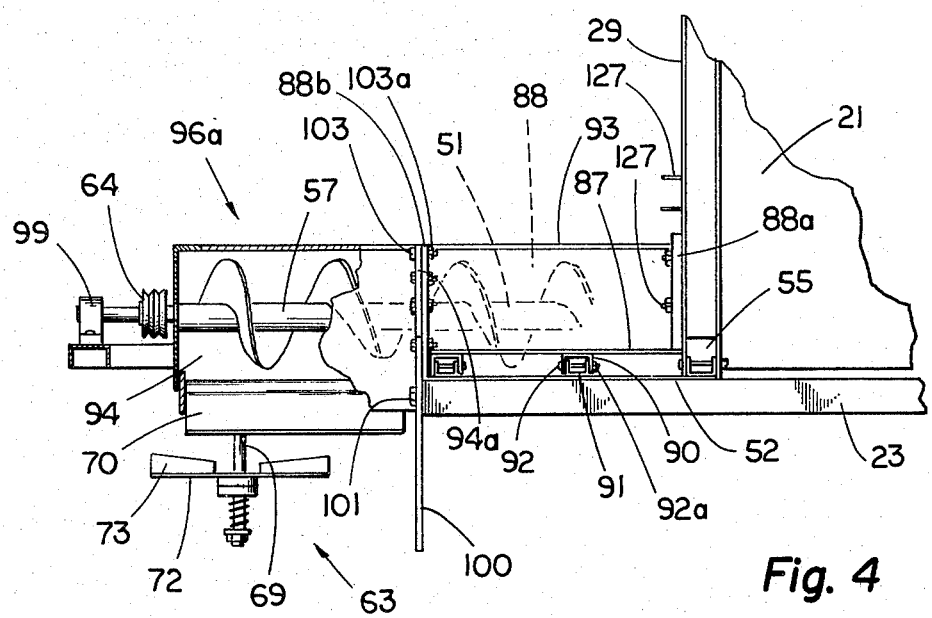
FIG. 4 is a fragmentary detailed view of auger sections comprising a portion of the FIG. 1 implement.
Figure 4B:
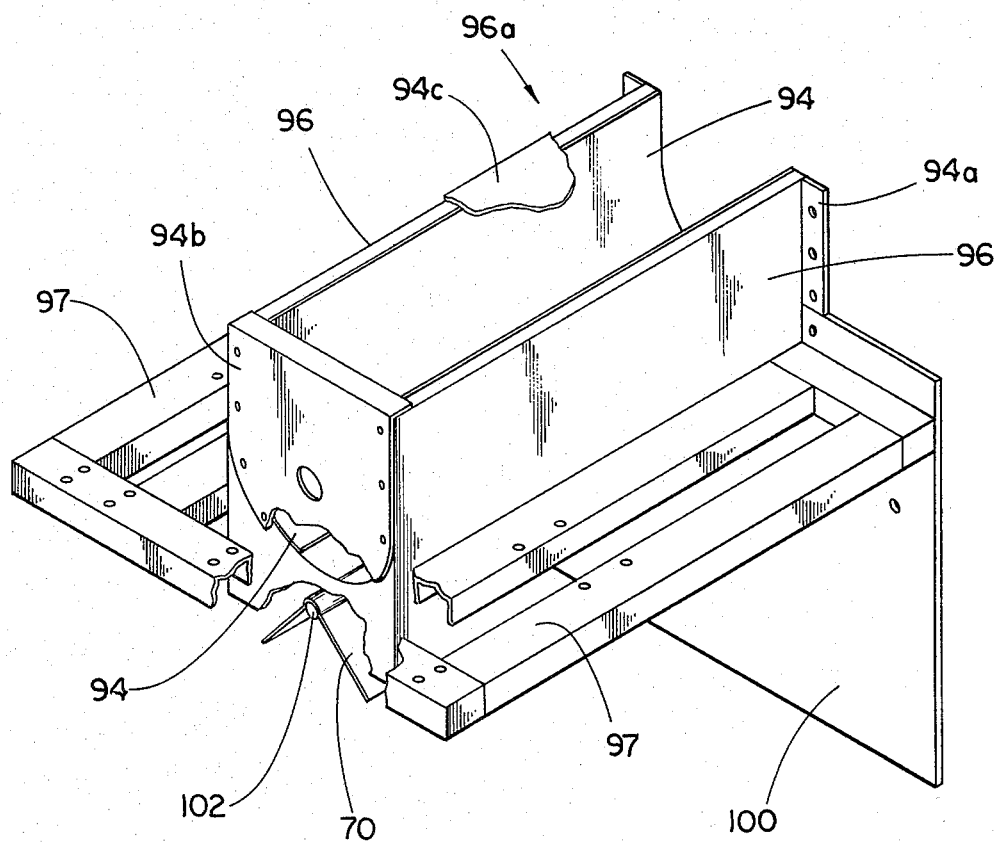
FIG. 4b is a perspective view of a trough and frame arrangement comprising a portion of the FIG. 1 implement.

The third auger section 57 is positioned within a trough which opens over a distribution plate 70, only the ends of which are shown; and with dry material loaded into hopper 21 and the auger sections rotating, this dry material is transferred from the hopper 21, through aperture 49 and to the open portion of the trough by auger section 57 where the material falls onto distribution plate 70 (see FIG. 4b). Plate 70 is constructed and positioned such that the falling dry material is divided into two streams, as shown by arrows 71, and directed onto fans 63. Each fan is constructed of a flat, circular plate 72 with a plurality of blades 73 upright thereto and extending radially from the axis of rotation of shaft 69, such that as the plate 72 rotates (driven by shaft 69), the blades 73 catch dry material against their surfaces and then propel this material in a somewhat part-circular broadcast pattern. Two such patterns are broadcast, one by each fan 63, and the patterns are on opposite sides of the center line of the path of travel of truck 24.

FIG. 3 is a fragmentary side elevational view of hopper 21 as attached to flat bed 23 showing the connection arrangement of auger sections 48 and 51. Auger sections 48 and 51 are shown with shafts 48a and 51a and helical flights 48b and 51b, respectively. The two shafts 48a and 51a are connected by means of connecting pin 76 which is inserted into the end of each shaft and secured there by smaller diameter pins which extend through pin 76, normal to its axis, and through each shaft 48a and 51a. A bearing support device consisting of a bearing 77 and support bracket 78 is attached to rear wall 29 and supports connecting pin 76. Support bracket 35, L-clamp 36 and associated hardware are shown securing hopper 21 to the flat bed 23 of truck 24. A shroud 79 which is positioned above auger section 48 has been only partially shown in FIG. 3 so that the details of the auger section connection could be shown. This shroud is shown by FIG. 3a which is a view from the interior of hopper 21 taken along line 3a—3a in FIG. 3. Referring to FIG. 3a, shroud 79 is shown as being of a triangular, open-V shape and is positioned above and around auger section 48 which is only shown by a phantom line so as not to obscure the description of the other features. Auger section 48 can be oriented in FIG. 3a by referring to shaft 48a whose cross section is shown. Aperture 49 in rear wall 29 is an elongated D-shaped opening and across the flat edge of aperture 49 is a flange 80 which attaches to support bracket 78. Support bracket 78 is a U-shaped member at its center and this U-shaped portion 83 supports bearing 77. Although it may appear that shaft 48a fits within bearing 77, it should be noted that shaft 48a is merely concentric to bearing 77 and that pin 76 is positioned within the bearing as shown in FIG. 3.

The base of hopper 21 is open and a base plate 84 of a curved shape similar to the curvatures of aperture 49 and the helical flight 48b of auger section 48 is welded to hopper 21 to seal off its open base. This design allows the helical flight 48 to be positioned extremely close to the bottom surface of the hopper without interference and thereby minimizes the amount of dry material which is left in the hopper (unable to be transferred out by auger rotation). Shroud 79 is supported by an adjustable clamping device (see FIGS. 5 and 5a). This clamping device permits shroud 79 to be positioned at variable elevations above auger section 48. Due to the shape of hopper 21, as shroud 79 is raised in a vertical direction, the clearance between the edges 85 of shroud 79 and side walls 86 of hopper 21 increases. With dry material loaded into hopper 21, the amount of clearance between edges 85 and side walls 86 controls the volumetric flow rate of dry material into auger section 48. Shroud 79 can also be lowered by the clamping means to where edges 85 are placed in contact with walls 86. This in-contact position is then able to be maintained by locking provisions associated with the clamping means, as will be described hereinafter.

Figure 4A:
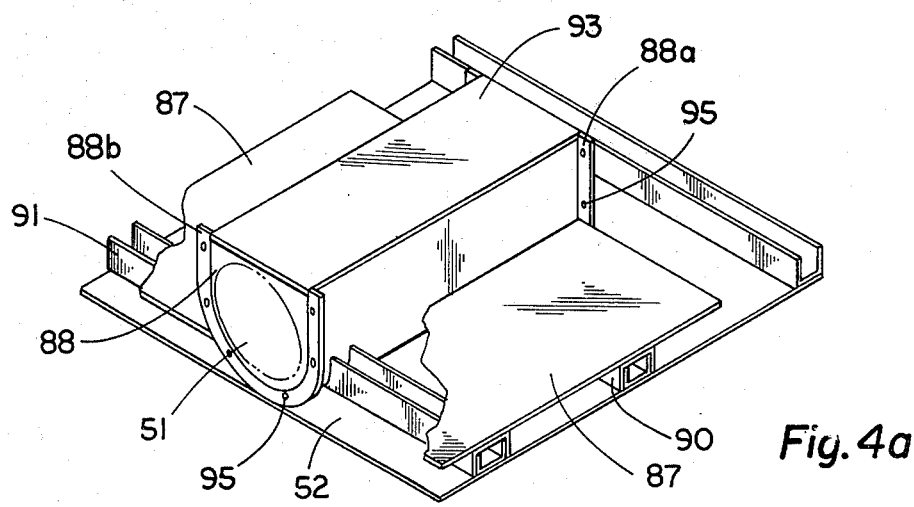
FIG. 4a is a perspective view of a trough and frame arrangement comprising a portion of the FIG. 1 implement.

FIG. 4 continues approximately from where FIG. 3 left off, showing the position and connection of auger sections 51 and 57 and their relationship to spreading fans 63. Auger sections 51 and 57 connect to one another in virtually the same way as described for sections 48 and 51 by means of a concentric pin and perpendicular locking pins (not shown). Auger section 51 fits within a semicircular trough 88 which is supported by frame 52. One end of frame 52 is positioned within recess 55 of rear wall 29 and is secured to rear wall 29 by a series of bolts and nuts. The arrangement of frame 52, auger section 51 and trough 88 are shown in greater detail in the perspective view of FIG. 4a. The portions of frame 52 which extend on either side of trough 88 are covered with cover plates 87 which have depending channels 90 which fit around the block U-shaped angles 91 which are an integral part of frame 52. Channels 90 are secured to angles 91 by means of bolts 92 and nuts 92a. Each end of trough 88 has a flange 88a and 88b which include a series of clearance holes 95 which are used on one end to attach to the enclosure-like structure 96a surrounding auger section 57 and on the other end to fit over studs 127 extending from the exterior surface of rear wall 29. Trough 88 is fitted with a lid 93 as a safety measure to enclose the open helical flight 51b of auger section 51 and thereby prevent any inadvertent contact with flight 51b by a user of the implement or bystander.

Auger section 57 is also positioned within a trough 94 which is open over distribution plate 70 as previously described. Trough 94 fits within sides 96 of an enclosure-like structure 96a and is welded thereto. This welded unit of trough 94 and enclosure-like structure 96a is positioned between and secured to the innermost channels of platform 97. Trough 94 is positioned relative to platform 97 such that flange members 94a of trough 94 are adjacent to the outer surface of the end of platform 97. Welded to the forward end of platform 97 and opening around trough 94 is a splash plate 100. This splash plate has a series of holes which are used for attachment in both dry material and liquid configurations. In this arrangement, flange 94a and splash plate 100 are able to be attached to the flange at the distal end of trough 88 by means of bolts 103 and nuts 103a. This method of attachment fixes the position both lengthwise and depthwise of trough 94 and enclosure-like structure 96a within platform 97.

The end of trough 94 opposite flange 94a is fitted with a closure plate 94b which is secured to the sides 96 by a stud and nut arrangement. This plate 94b provides a shaft clearance hole for the shaft of auger section 57 to extend through. Clearance between the end channel of platform 97 and closure plate 94b is provided for mounting double groove pulley 64. The top of platform 97 on either side of enclosure-like structure 96a provides a suitable mounting surface for gear boxes 66 while the end channel of platform 97 is suitable for mounting bearing support blocks 99. Belt and pulley arrangements including pulleys 64 and 98 and belts 65 account for the transfer of rotary power from auger section 57 to gear boxes 66. Splash plate 100 is also attached to the end of flat bed 23 by means of bolts 101. FIG. 4b is a perspective view of trough 94, enclosure-like structure 96a, sides 96, platform 97 and splash plate 100. For drawing clarity, spreading fans 63, gear boxes 66, pulleys 64 and 98 and bearing support blocks 99 have been deleted, although some of the mounting hole clusters for these components are shown. Distribution plate 70 is a V-shaped plate which is positioned over and attached to pin 102 which extends in parallel orientation the majority of the length of trough 94. Trough 94 is shown fitted with a lid 94c which serves as a safety barrier from auger section 57.

Figure 5:
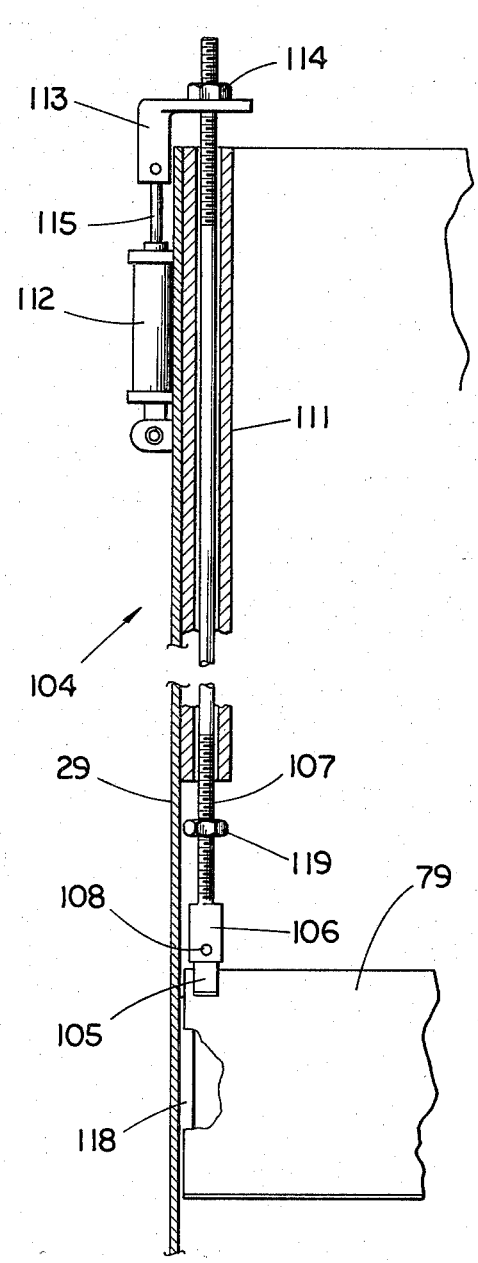
FIG. 5 is a detailed elevational view of an adjustable clamp comprising a portion of the FIG. 1 implement.
Figure 5A:
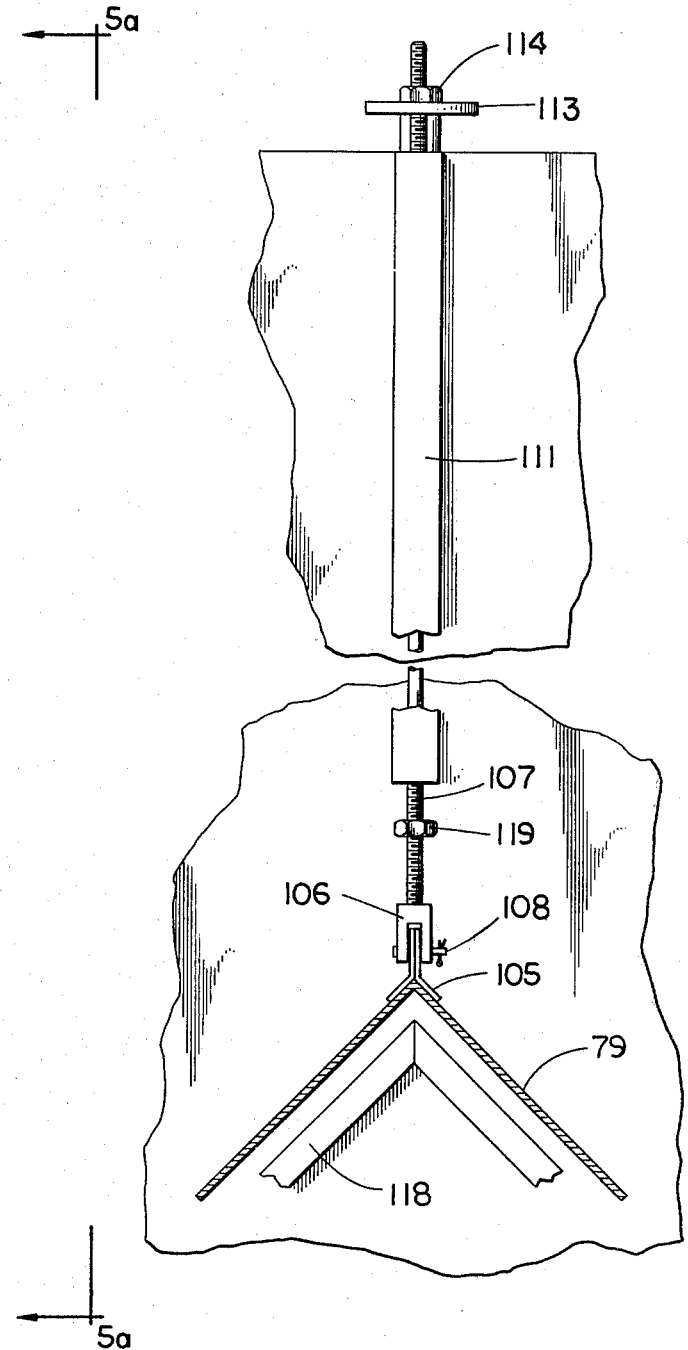
FIG. 5a is a detailed, end elevational view of the FIG. 5 clamp taken along line 5a—5a of FIG. 5.

FIGS. 5 and 5a are detailed side and end views, respectively, of adjustable clamping member 104 which attaches to shroud 79. A pair of Y-shaped brackets 105 are welded to the upper edge of shroud 79, one at each end, and each bracket 105 is secured to clevis end 106 of rod 107 by means of pin 108. The arrangement of FIGS. 5 and 5a is present at both the front wall 28 and the rear wall 29, but only the rear wall arrangement is shown and its description is representative of both walls. A guide 111 is welded to the internal surface of rear wall 29 and rod 107 extends through this guide 111 at both ends. Attached to the exterior surface of rear wall 29 is a hydraulic cylinder 112 whose piston 115 connects to one end of rod 107 through L-bracket 113 and adjusting nut 114. As the piston 115 extends, L-bracket 113 lifts up on nut 114 which is threaded onto rod 107 and shroud 79 is raised in a vertical direction. Similar movement at the opposite end elevates the entire shroud 79 to a generally horizontal position above auger section 48 (not shown). If two extensions of piston 115 are required to achieve the desired elevation of shroud 79, then rod 107 must be clamped while piston 115 and L-bracket 113 are retracted. Then nut 114 is advanced into contact with L-bracket 113 and the piston is ready to make another extension. As will be described in greater detail later, material-dispensing implement 20 is changeable from the spreading of a dry material to a configuration capable of transporting liquid. This liquid is then able to be pumped from hopper 21. One step in this changeover is to clamp shroud 79 against boss 118 which consists of a V-shaped, raised metal plate welded to the interior surfaces of rear wall 29 and front wall 28. By the use of locking nut 119 which is threadedly received on rod 107, shroud 79 is able to be forced against boss 118 and held there. With hydraulic cylinder disengaged, force on rod 107 will force shroud 79 against boss 118. Then with this force still applied, nut 119 is advanced toward the end of guide 111. Once the force is removed, shroud 79 will remain against boss 118 due to the location of nut 119 pressing against guide 111.

Figure 6:
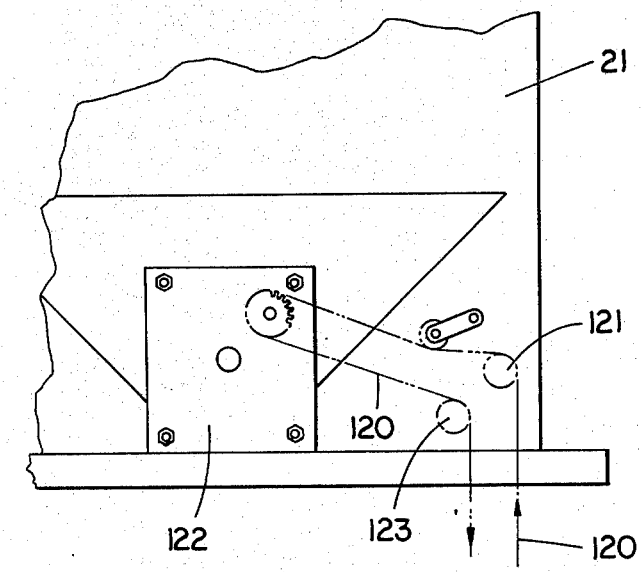
FIGS. 6 and 6a are front and side views, respectively, of rotary power means connectable to the FIG. 1 implement.
Figure 6A:
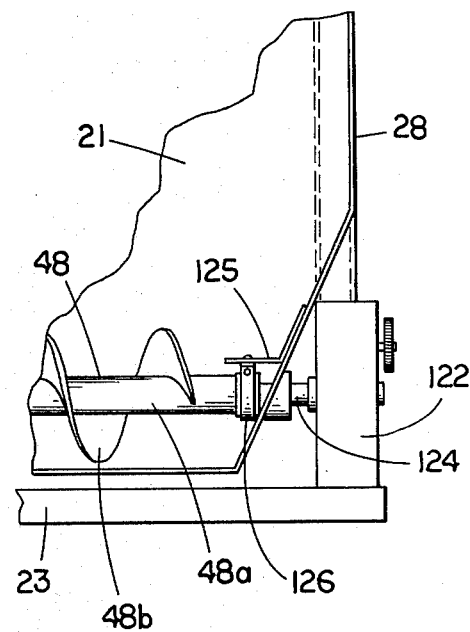

FIGS. 6 and 6a are end and side views, respectively, of the drive train which couples one end of the first auger section 48 to the truck's power take-off. Roller chain 120 is used to transmit the power take-off torque across sprocket 121 to gear reducer 122 and back to the power take-off across sprocket 123. The output shaft 124 of gear reducer 122 is mechanically coupled to shaft 48a of auger section 48 and auger section 48 is supported by a bracket 125 and bearing 126 combination mounted to the inclined portion of interior surface of the front wall 28. As shown gear reducer 122 is actually positioned underneath hopper 21 and is between the hopper 21 and the cab 30 of truck 24. A suitable device for gear reducer 122 is a model 203D25, double reduction, shaft-mounted reducer, available through Morris Chain of Ithaca, New York.

Figure 7A:
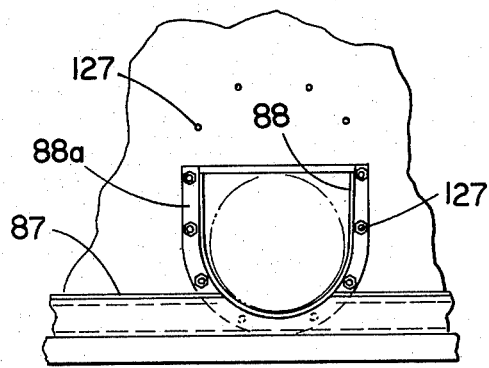
FIG. 7a is a sectioned view of the attachment of one auger section to the FIG. 3 hopper taken along line 7a—7a of FIG. 7.
Figure 7:
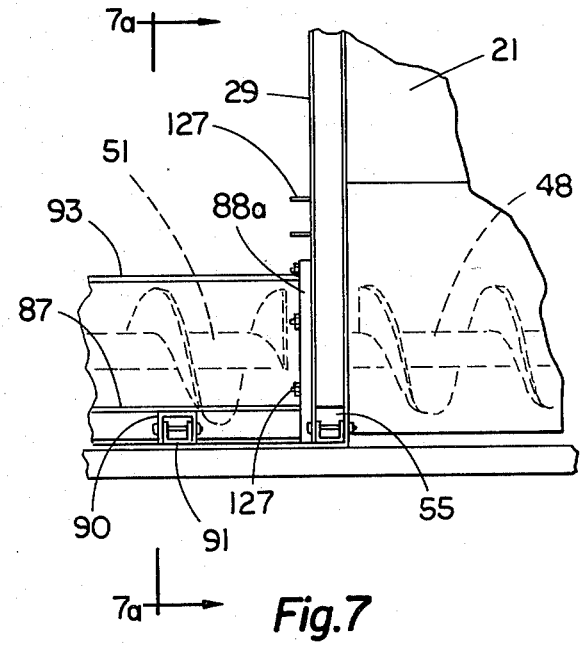
FIG. 7 is a detailed fragmentary view of the connection between two auger sections comprising a portion of the FIG. 1 implement.

FIGS. 7 and 7a show a partial side and a partial end view, respectively, of the connection of auger sections 48 and 51. The additional details shown by FIGS. 7 and 7a which were omitted from FIG. 3 consist of flange 88a which is an elongated D-shaped member which is welded to the end of trough 88. Extending outwardly from the exterior surface of rear wall 29 are a series of studs 127. Flange 88a attaches to several studs 127 of the series and is secured to rear wall 29 by nuts received on the studs. Flange 88a is compatibly sized to fit around the periphery of aperture 49 and fits trough 88 against rear wall 29 with a smooth connection in line with curved base plate 84 (see FIG. 3a) such that dry material being transported from hopper 21 through aperture 49 will continue directly into trough 88 without a disruption to the flow or spillage through any cracks.

This concludes the discussion of the dry material configuration of material-dispensing implement 20. Throughout the foregoing disclosure, certain features have been described which although are required for dry material, support a dual function when the implement is changed to a liquid distribution configuration. The remainder of the disclosure is directed to the structure of the conversion of the implement for liquid applications.

Figure 8:
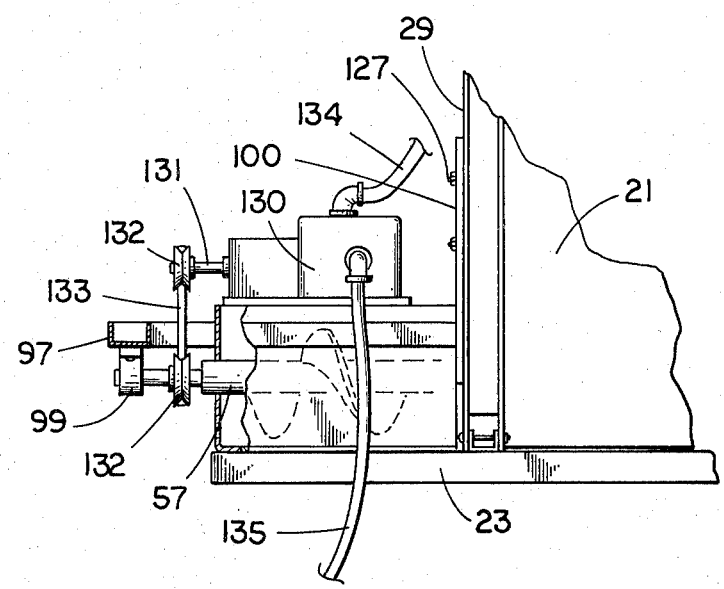
FIG. 8 is a detailed, side elevational view of a pumping mechanism usable with the FIG. 1 implement.

The first step in the change from dry material to liquid is shown in FIG. 8. With frame 52, trough 88 and auger section 51 removed, splash plate 100 is unbolted from bed 23 and and flange members 94a are unbolted from flange 88b. Next platform 97 is inverted and placed over the plurality of studs 127 extending from the exterior surface of rear wall 29. It should be noted that splash plate 100, enclosure-like structure 96a, sides 96 and trough 94 remain with platform 97 when inverted, but the majority of the drive components such as gear boxes 66 and spreading fans 63 are removed. The several studs which were used to mount the flange 88a of trough 88 and the plurality of studs which mount flange members 94a and splash plate 100 against the rear wall 29 are all part of the same series of studs 127, some of which are used for one application, others of which are used for the other application with certain studs being used for both applications. Auger section 57 is mechanically coupled to auger section 48 for use as rotary power means. A flat mounting surface provided by the edges of sides 96 of enclosure-like structure 96a are used to mount a pump 130 or other suitable liquid delivery device. In this configuration, distribution plate 170 is also removed from pin 102. The end of auger section 57 and the end of the input shaft 131 to pump 130 are fitted with pulleys 132 which are connected by belt 133. Hose 134 connects the inlet port of pump 130 to the liquid reservoir within hopper 21 (once converted for a liquid) and hose 135 connects the outlet port of pump 130 to a suitable liquid-distributing means such as a spraying mechanism (not shown). Although pump 130, shaft 131, pulleys 132 and belt 133 are not specifically claimed as part of this invention, but are provided for reference only, the important aspect to note is that means are provided for the mounting of some type of pump and rotary power is provided by means of augers 48 and 57. This rotary power which comes from the truck's power take-off will be available to whatever pumping mechanism is used.

Figure 9:
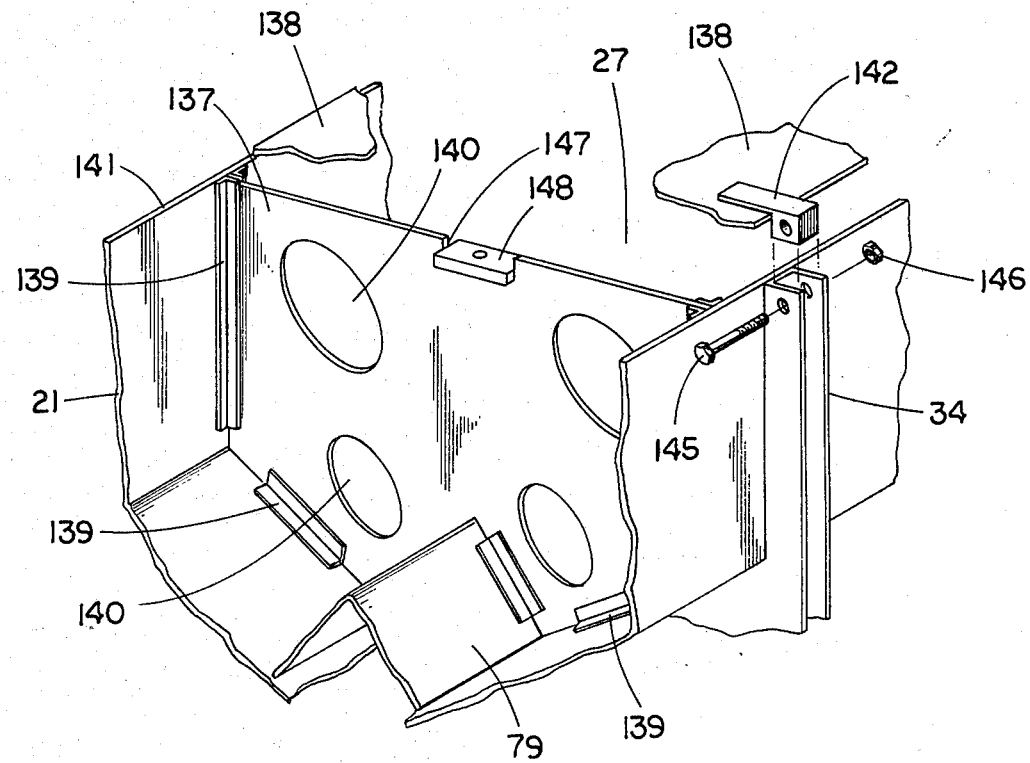
FIG. 9 is a partial perspective view of a lid and a baffle plate comprising a portion of the FIG. 1 implement when in a liquid distributing configuration.

FIG. 9 is a detailed view of a baffle plate 137 and lid 138 which are respectively fitted within and atop hopper 21. Slotted guides 139 are welded to the sides and base of hopper 21 into which baffle plate 137 is slidably inserted. The lower portion of baffle plate 137 is relieved in order to fit over shroud 79. When hopper 21 is filled with liquid, jerking or shifting movement of truck 24 tends to cause liquid to slosh around and at times exerting large forces on the front and rear walls of the hopper making the truck difficult to handle. To break up the waves of liquid, baffle plate 137 is positioned approximately midway between the front wall 28 and rear wall 29. Sloshing liquid striking plate 137 will have its impacting effect dampened significantly. A plurality of openings 140 are provided to permit passage of the liquid from the front to the rear. Lid 138 attaches around the outer edge 141 of hopper 21 and completely encloses open top 27 of hopper 21. Lid 138 is attached to hopper 21 by means of retainers 142 which fit within the upper end of arm portions 34 of frame 22 (see FIG. 1) and are secured to arm portions 34 by bolts 145 and nuts 146. Means (see FIG. 10) are provided to secure baffle plate 137 to lid 138 such that baffle plate 137 is rigidly supported and is able to withstand the force of the sloshing liquid. Notch 147 and block 148 comprise a part of the securing means.

Figure 10:
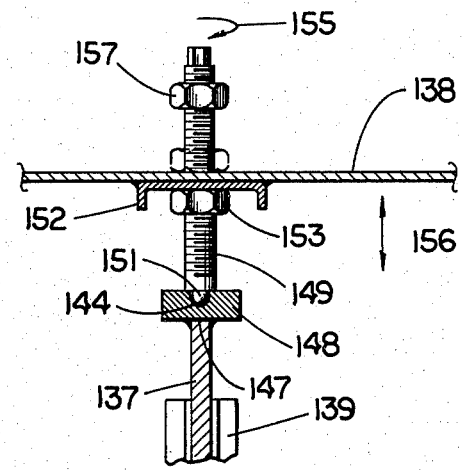
FIG. 10 is a fragmentary detailed view of the FIG. 9 baffle plate attached to the FIG. 9 lid.

FIG. 10 is a side view of baffle plate 137 as it is fitted within guides 139 and secured to lid 138. Block 148 which has a cylindrical depression 144 centrally located therein is welded into notch 147. Securing stem 149 which is positioned through an opening in lid 138 directly above notch 147 has a protuberance 151 at one end which fits within depression 144 for alignment. Channel 152 which extends for the full width of lid 138 serves to strengthen the lid and to provide means for the securing of the lid to the baffle plate. Nut 153 is welded to the underside of channel 152 and is threadedly received on stem 149. As stem 149 is turned (see direction of arrow 155) a force is applied to both block 148 and subsequently to baffle plate 137 and to lid 138. The direction of these equal and opposite forces are indicated by arrow 156. Once the lid 138 and plate 137 have been moderately stressed (as indicated by a slight bowing of the lid), nut 157 is tightened down onto lid 138 to hold the forces in place.

Figure 11:
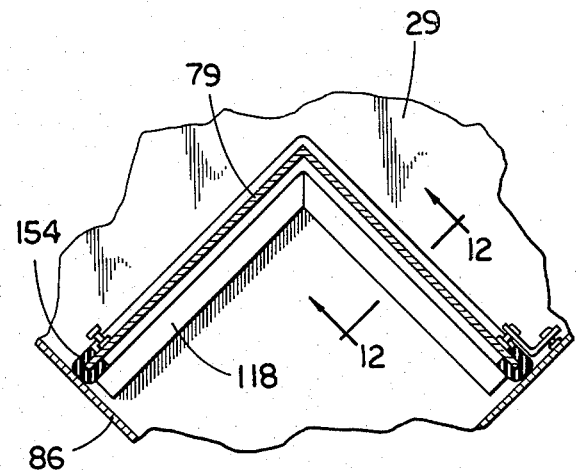
FIG. 11 is a sectioned view of a shroud taken along line 11—11 of FIG. 3 comprising a portion of the FIG. 1 implement when in a liquid distributing configuration.

FIG. 11 is a view taken along line 11—11 of FIG. 3 and shows in greater detail how shroud 79 is adapted for sealing against the side walls 86, the front wall 28, and the rear wall 29 of hopper 21 and around auger section 48. Each end and each edge of shroud 79 is fitted with a slotted rubber gasket 154 which is merely pushed onto shroud 79. In order to easily fit these gaskets onto shroud 79, the shroud may be disconnected from the two clamping members and removed from hopper 21. However, due to the clearance between side walls 86 and edges 85 when the shroud 79 is elevated, gaskets 154 can be installed without having to disconnect the shroud from the two clamping members. As shroud 79 is forced downwardly into contact with side walls 86 of hopper 21 and secured there by means of nut 119 on clamping member 104 as previously described, the rubber gaskets 154 will be compressed into a liquid-tight sealing arrangement with the internal surfaces of hopper 21. The ends of shroud 79 which fit over boss 118 as described in FIGS. 5 and 5a for rear wall 29 and which was indicated representative for front wall 28, will also be forced into sealing engagement against bosses 118 at the same time. The size of gaskets 154 is such that these gaskets are able to make sealing contact with side walls 86 and still overlap the ends of boss 118. By this arrangement of shroud 79, gaskets 154, side walls 86 and bosses 118; a liquid-tight enclosure is made around auger 48 and a liquid reservoir is created out of hopper 21. To effectively use hopper 21 as a liquid reservoir without contamination of materials, hopper 21 should be cleansed of all dry material prior to adding any liquid.

Figure 12:
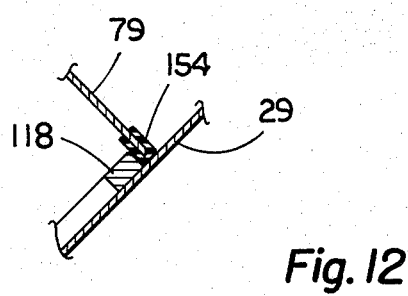
FIG. 12 is a sectioned view of the FIG. 11 shroud taken along line 12—12 of FIG. 11.

FIG. 12 shows a section view of the arrangement of shroud 79, gaskets 154, side walls 86 and bosses 118 as viewed along line 12—12 of FIG. 11. This section view shows in greater detail the arrangement of the shroud as it fits both against the rear wall of the hopper and overlaps the surface of boss 118 for sealing both along boss 118 and against the rear wall.

Figure 13C:
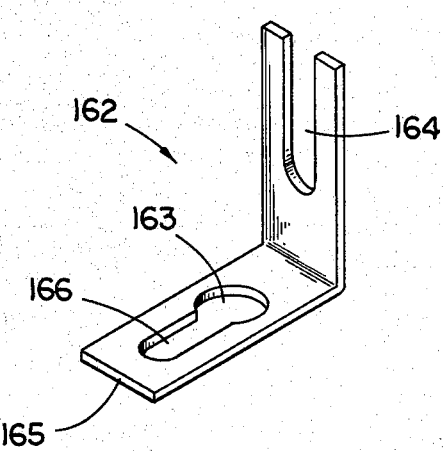
FIG. 13c is a perspective view of a lug comprising a portion of the FIG. 1 implement.
Figure 13E:
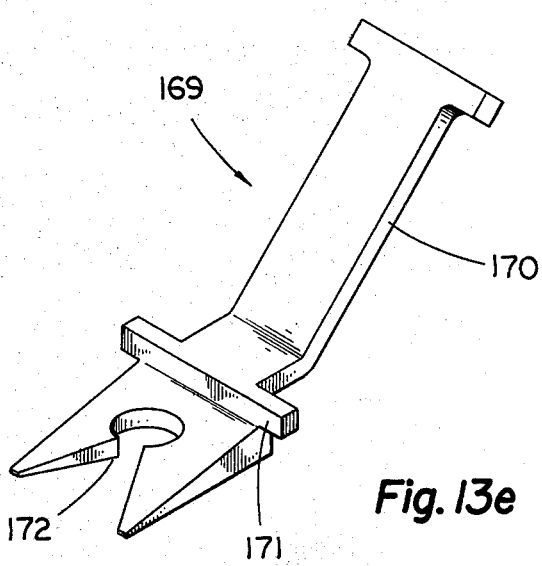
FIG. 13e is a perspective view of a tool suitable to attach the FIG. 13c lug onto the FIG. 13a stud and FIG. 13b bolt.
Figure 13D:
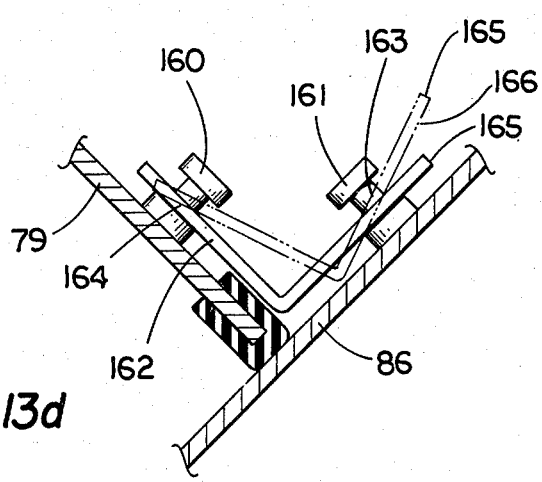
FIG. 13d is a perspective view of the FIG. 13c lug positioned over the FIG. 13a stud and the FIG. 13b bolt.
Figure 13A:
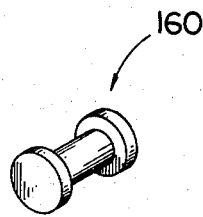
FIG. 13a is a perspective view of a locking stud comprising a portion of the FIG. 1 implement.
Figure 13B:
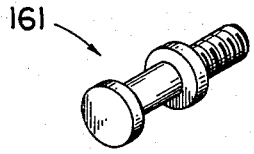
FIG. 13b is a perspective view of a locking bolt comprising a portion of the FIG. 1 implement.
Figure 13:
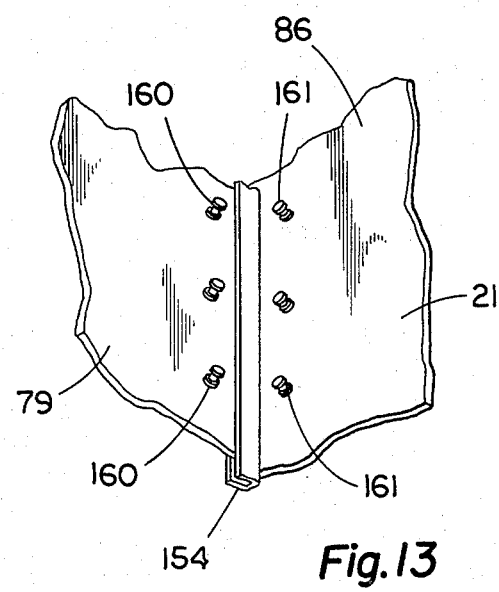
FIG. 13 is a plan view of a stud and bolt arrangement comprising a portion of the FIG. 1 implement.

Referring to FIGS. 13-13e, there is illustrated securing means by which the shroud 79 with gaskets 154 attached, is held in sealing contact with side walls 86 of hopper 21. A plurality of locking studs 160 (see FIG. 13a) are welded to the surface and along the edge of shroud 79 above the location of gasket 154. In line with studs 160 are an equal number of locking bolts 161 (see FIG. 13b) which are threaded into the side wall 86 of hopper 21. Studs 160 and bolts 161 are pulled toward each other, by means of locking lugs 162 (see FIG. 13c), thereby pulling shroud 79 against hopper side walls 86. The locking lugs 162 are installed by first placing opening 163 over the enlarged head of bolt 161 and around the smaller diameter body portion and recess 164 is located adjacent to stud 160. FIG. 13d shows by lines the starting position for lug 162 and the solid lines show the final position. As force is applied on end 165 of lug 162, the smaller diameter of bolt 161 slides into the narrower slot 166. As this occurs, recess 164 will be forced beneath the enlarged head of stud 160. In the final position, forces applied to shroud 79 in a vertical direction will encounter resistance by the locking arrangement of lugs 162, bolts 161 and studs 160. This arrangement retains shroud 79 snugly against hopper 21. A variety of tools can be used to apply the necessary force on end 165. Such a tool needs to have gripping means, an offset edge to contact end 165 and a recessed portion to clear the smaller diameter of stud 160. One possible tool 169 for this purpose is shown in FIG. 13e in which the gripping means 170, offset edge 171 and recessed portion 172 are indicated.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A material-dispensing implement mountable to a vehicle for distributing dry material when said implement is in a first configuration and liquid when in a second configuration, said implement being repeatedly changeable from one configuration to the other configuration, said material-dispensing implement comprising:
    a frame mountable to said vehicle;
    an open vessel attachable to said frame for holding dry material in one configuration and liquid in the other configuration;
    mean for conveying dry material from within said vessel to a remote location when said implement is in said dry material configuration; and
    means for changing said material-dispensing implement from one configuration to the other configuration, said changing means comprising:
        (a) a shroud positioned within said vessel and above a portion of said conveying means;
        (b) a plurality of gasket members attachable to the periphery of said shroud;
        (c) a plurality of adjustable clamping devices attached to said vessel and to said shroud; and
        (d) means for securing the periphery of said shroud; with gasket members attached, against the interior surface of said vessel to make sealing contact therewith.

2. The material-dispensing implement of claim 1 in which said securing means comprises:
    a plurality of studs attached to said shroud;
    a plurality of bolts attached to the interior surface of said vessel, each of said bolts being adjacent to each of said studs; and
    a plurality of locking lugs slidably received by said studs and by said bolts and positionable so as to tightly draw said shroud against the interior surface of said vessel.

3. The material-dispensing implement of claim 1 in which each of said adjustable clamping devices is operable to provide clearance between the shroud and the vessel when said implement is in a dry material configuration and operable to force said shroud against the interior surface of said vessel when in said liquid configuration, each of said adjustable clamp devices comprising:
    a vertically extending rod having a first end and a second end, said first end being attached to said shroud;
    a guide secured to said vessel and through which said rod extends;
    a nut threadedly received by said rod and positioned between said shroud and said guide;
    a hydraulic cylinder having an extendable and retractable piston;
    a bracket connecting said piston to the second end of said rod.

4. The material-dispensing implement of claim 2 in which each of said adjustable clamping devices is operable to provide clearance between the shroud and the vessel when said implement is in a dry material configuration and operable to force said shroud against the interior surface of said vessel when in said liquid configuration, each of said adjustable clamp devices comprising:
    a vertically extending rod having a first end and a second end, said first end being attached to said shroud;
    a guide secured to said vessel and through which said rod extends;
    a nut threadedly received by said rod and positioned between said shroud and said guide;
    a hydraulic cylinder having an extendable and retractable piston;
    a bracket connecting said piston to the second end of said rod.

5. The material-dispensing implement of claim 4 in which said vessel is a multiwalled hopper having an open top, a front wall and a rear wall with an aperture therein, and said conveying means comprises a rotatable auger member extending from the front wall of said hopper, through said aperture and to a remote location beyond the rear of said vehicle.

6. The material-dispensing implement of claim 5 in which a baffle plate is secured within said hopper between said front and rear walls and positioned above said shroud when said implement is in said liquid configuration.

7. The material-dispensing implement of claim 6 in which the open top of said hopper is fitted with a lid when in said liquid configuration, said lid being attachable to said baffle plate.

8. The material-dispensing implement of claim 7 in which said vehicle has a flat bed supported by a front and rear axle arrangement and the majority of the weight of said hopper is forward of said rear axle.

9. A material-dispensing implement mountable to a vehicle for distributing dry material when said implement is in a first configuration and liquid when in a second configuration, said implement being repeatedly changeable from one configuration to the other configuration, said material-dispensing implement comprising:
    a frame mountable to said vehicle;

an open vessel attachable to said frame for holding dry material in one configuration and liquid in the other configuration;

said vessel being a multi-walled hopper having an open top, a front wall and a rear wall with an aperture therein;

means for conveying dry material from within said vessel to a remote location when said implement is in said dry material configuration, said conveying means comprising a rotatable auger member extending from the front wall of said hopper, through said aperture and to a remote location beyond the rear of said vehicle; and means for changing said material-dispensing implement from one configuration to the other configuration, said changing means comprising:
(a) a shroud positioned within said hopper and above a portion of said rotatable auger member;
(b) a plurality of gasket members attachable to the periphery of said shroud;
(c) a plurality of adjustable clamping devices attached to said hopper and to said shroud; and
(d) means for securing the periphery of said shroud, with gasket members attached, against the interior surfaces of said hopper to make sealing contact therewith.

10. The material-dispensing implement of claim 9 in which said rotatable auger member comprises:

a first auger section positioned within said hopper and operable to transfer dry material from within said hopper to said aperture;

a second auger section mechanically coupled in line with said first auger section and operable to transfer along its length dry material received from said first auger section at said aperture; and a third auger section mechanically coupled in line with said second auger section and operable to transfer dry material from said second auger section to said remote location.

11. The material-dispensing implement of claim 9 in which said vehicle has a flat bed supported by a front and rear axle arrangement and the majority of the weight of said hopper is forward of said rear axle.

12. The material-dispensing implement of claim 10 in which said first auger section is rotated by means of a mechanical coupling arrangement connected to the power take-off of the vehicle transmission.

13. The material-dispensing implement of claim 2 in which said vehicle has a flat bed supported by a front and rear axle arrangement and the majority of the weight of said hopper when holding dry material as well as when holding liquid is forward of said rear axle.

14. The material-dispensing implement of claim 12 in which said second auger section is detachable from said first and said third auger sections and once detached, said enclosing structure of said third auger section is mountable in an inverted position to the rear wall of said hopper, said enclosing structure thereby providing a mounting surface for attachment of a liquid delivery device when said implement is converted to said liquid configuration.

15. A method of converting a fertilizer and chemical-spreading implement from an auger transporting, dry material configuration to an auger driving, liquid configuration, said conversion being reversible, said implement having a material vessel, a shroud positioned therein and three adjoining, in-line, auger sections, which comprises:

removing virtually all the dry material from with said vessel;

disconnecting said shroud from said vessel by disconnecting said shroud from adjustable clamping devices attached to said vessel;

attaching a series of gasket members to the periphery of said shroud;

reconnecting said shroud to said vessel;

pushing downwardly on said clamping devices to press said shroud against said vessel such that the ends of said shroud make sealing engagement with said vessel and maintaining said engagement by means of said clamping devices;

securing a plurality of locking devices between the shroud and the vessel such that the sides of said shroud are held in sealing engagement against said vessel, thereby completing the steps to make said vessel liquid-tight;

placing a baffle plate within said container to disrupt waves of liquid sloshing from one end to the other of said vessel;

filling the vessel with a liquid;

fitting a lid to the open top of said vessel to enclose said liquid;

attaching said lid to said baffle plate;

removing the middle auger section from between the other two auger sections;

inverting the last auger section and attaching said last auger section to the rear wall of said vessel and to said first auger section which is positioned within said vessel; and mounting a rotary driven pump atop said last auger section and connecting a belt and pulley arrangement between said last auger section and an input shaft of said pump.

16. A method of converting a fertilizer and chemical-spreading implement from an auger-transporting, dry material configuration to an auger-driving, liquid configuration, said conversion being reversible, said implement including a frame attached to the flat bed of a vehicle, said frame having a rear wall portion, a vessel attached to said frame, said vessel having a single storage compartment, drive auger means disposed within said vessel and extending through said rear wall, and material discharge means located relative to said vehicle by means of said rear wall portion and attached to said rear wall portion, said material discharge means being coupled to and powered by said drive auger means, said material discharge means including dry material spreading fan means in said dry material configuration and liquid pump means in said liquid configuration, said two configurations being separate and distinct from each other such that any dry material and any liquid are free of co-mingling with each other, said method comprising:

removing virtually all of the dry material from within said vessel;

disconnecting said dry material spreading fan means from said drive auger means and from said rear wall portion;

connecting said liquid pump means to said drive auger means and to said rear wall portion; and filling said vessel with a liquid substance to be distributed.

* * * * *